United States Patent [19]
Florence

[11] Patent Number: 4,609,232
[45] Date of Patent: Sep. 2, 1986

[54] FLOPPY DISK STORAGE-EJECTION SYSTEM

[76] Inventor: Robert A. Florence, 17845 N. 6th St., Phoenix, Ariz. 85022

[21] Appl. No.: 747,325

[22] Filed: Jun. 21, 1985

[51] Int. Cl.⁴ ............................................. A47B 81/06
[52] U.S. Cl. ........................................ 312/16; 108/22; 108/21; 312/11
[58] Field of Search ...................... 312/10, 11, 15, 16, 312/18, 19, 97.1; 211/1.5; 108/20, 21, 22, 139, 142

[56] References Cited
U.S. PATENT DOCUMENTS

| | | | |
|---|---|---|---|
| 1,982,776 | 12/1934 | Woerner | 108/20 X |
| 2,549,083 | 4/1951 | Hamilton | 108/21 |
| 2,796,263 | 6/1957 | Moore | 312/11 X |
| 3,092,254 | 6/1963 | Germen | 312/15 X |

FOREIGN PATENT DOCUMENTS 2389350 1/1979 France ............................... 312/10

Primary Examiner—James T. McCall
Attorney, Agent, or Firm—Drummond & Nissle

[57] ABSTRACT

Improved apparatus for storing and dispensing floppy disks and other panel-shaped objects. The apparatus includes a rotatable storage carousel for floppy disks and a mechanism for selectively dispensing disks from the carousel, and includes a motor movable between two operative positions to alternately provide motive power to rotate the carousel and drive the disk dispensing mechanism.

1 Claim, 19 Drawing Figures

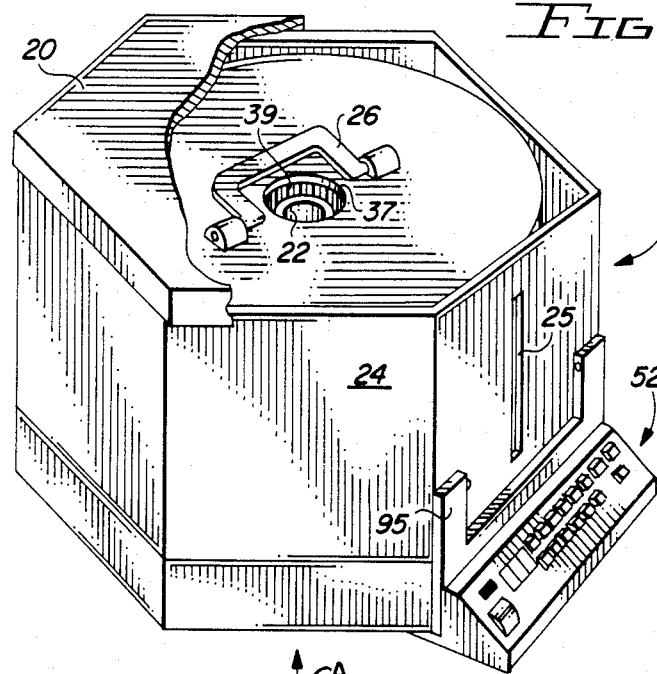
FIG-1
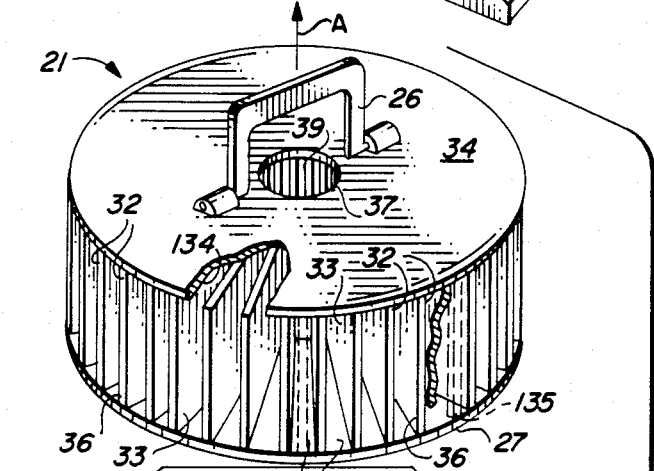
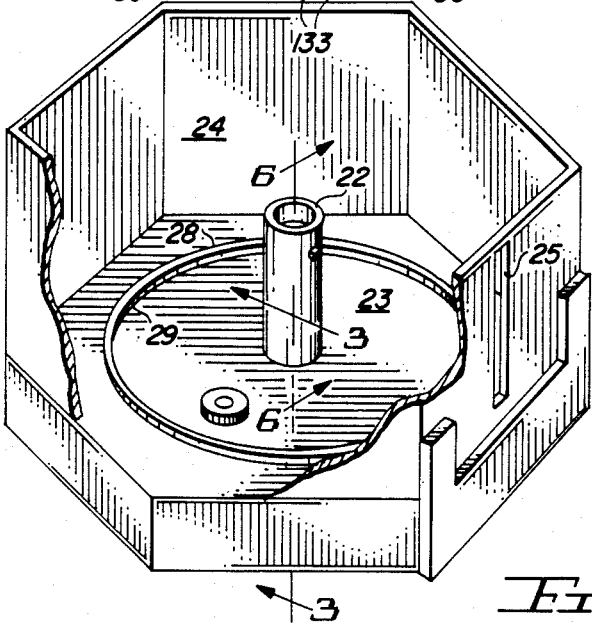
FIG-2
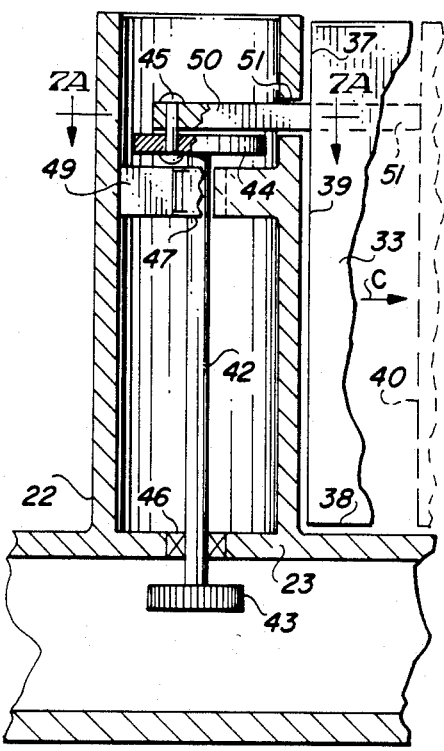
FIG-6
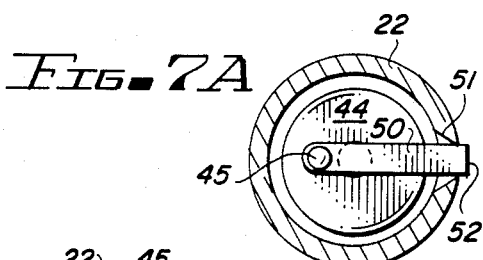
FIG-7A
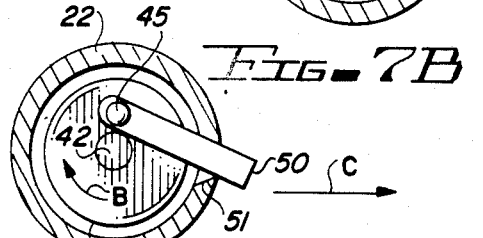
FIG-7B
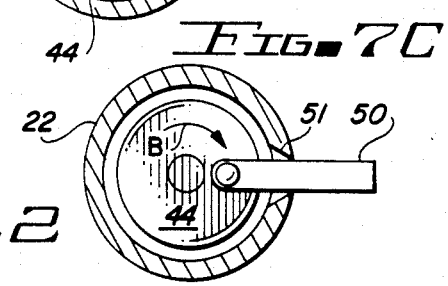
FIG-7C

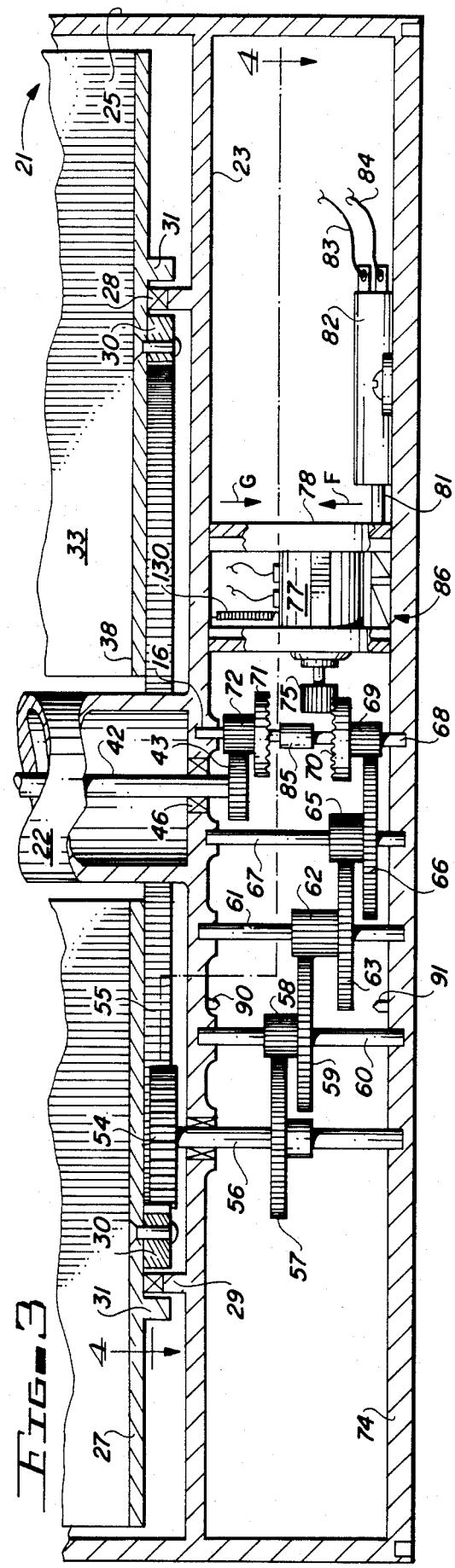
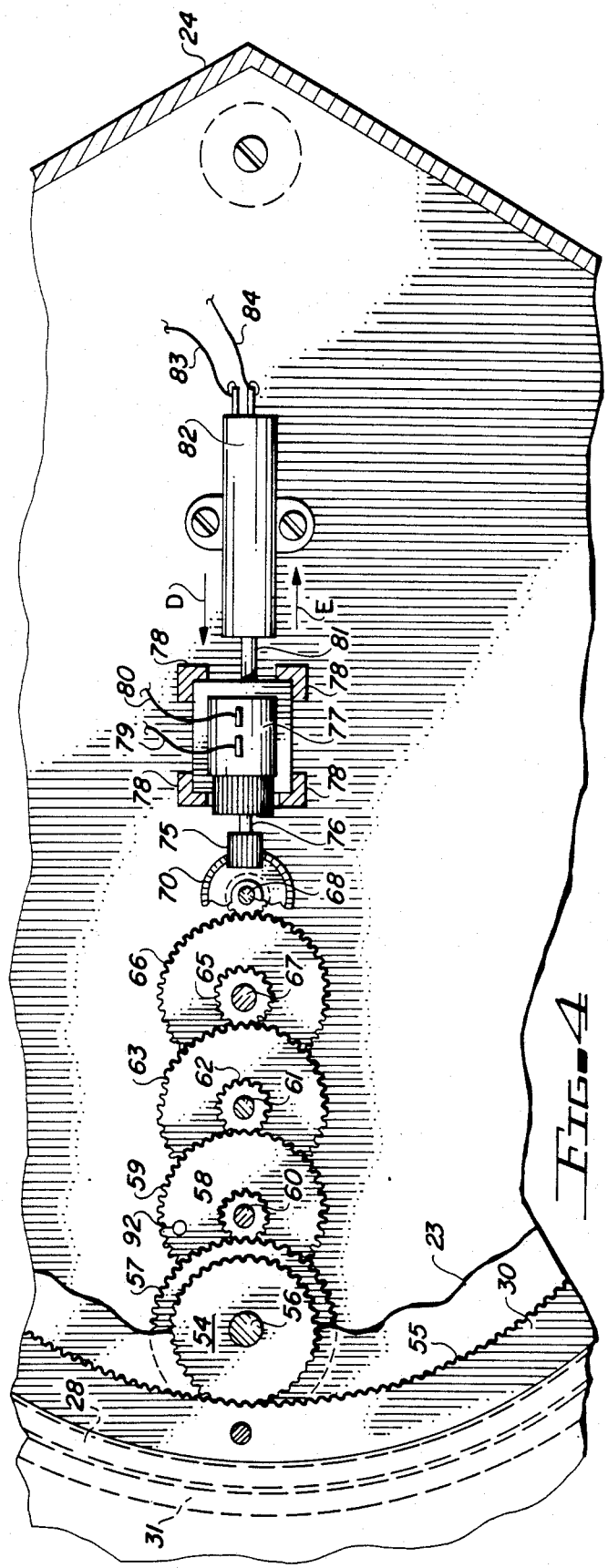
FIG-3
FIG-4

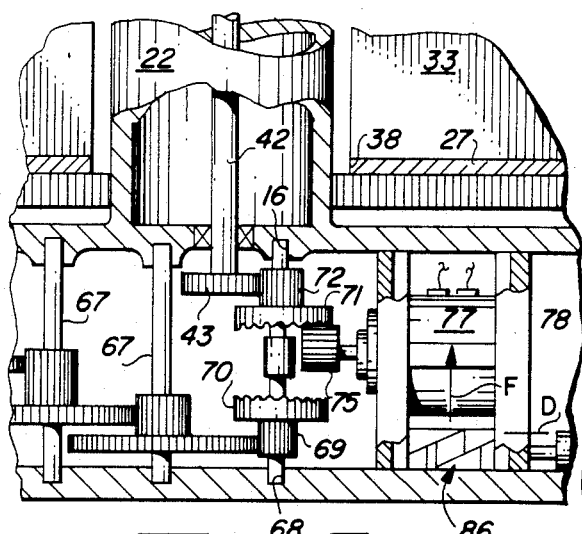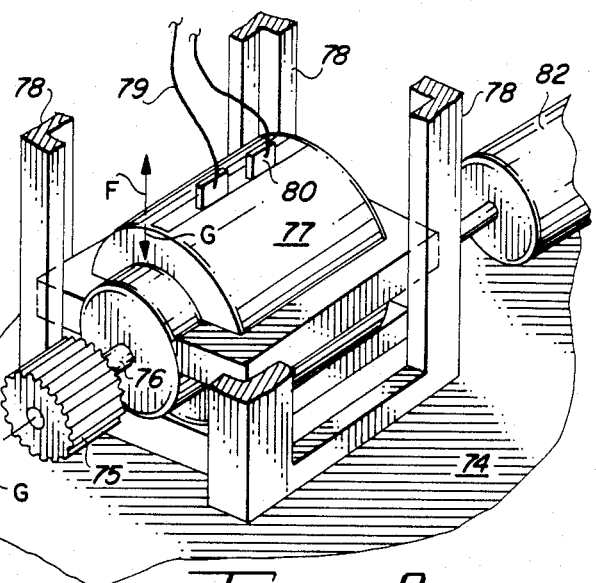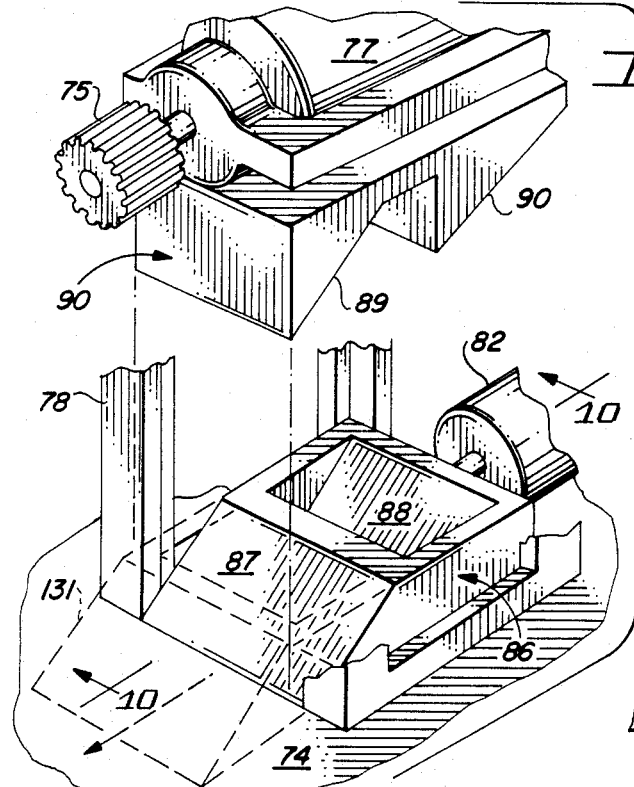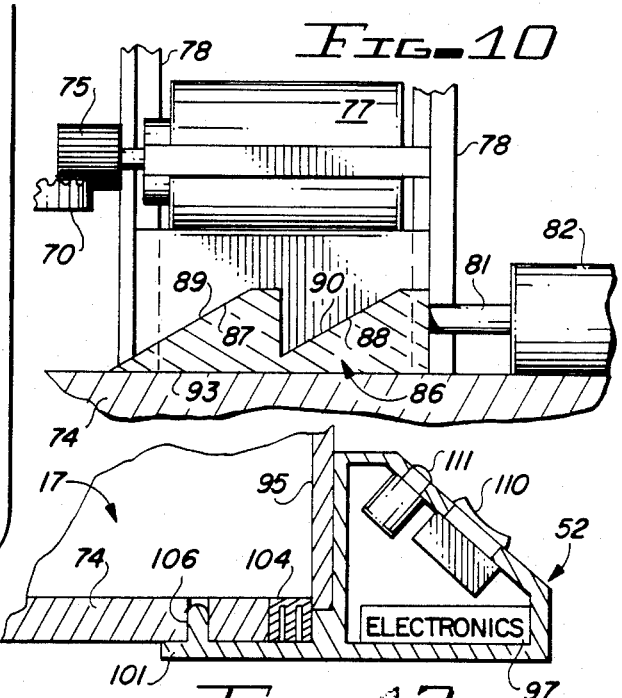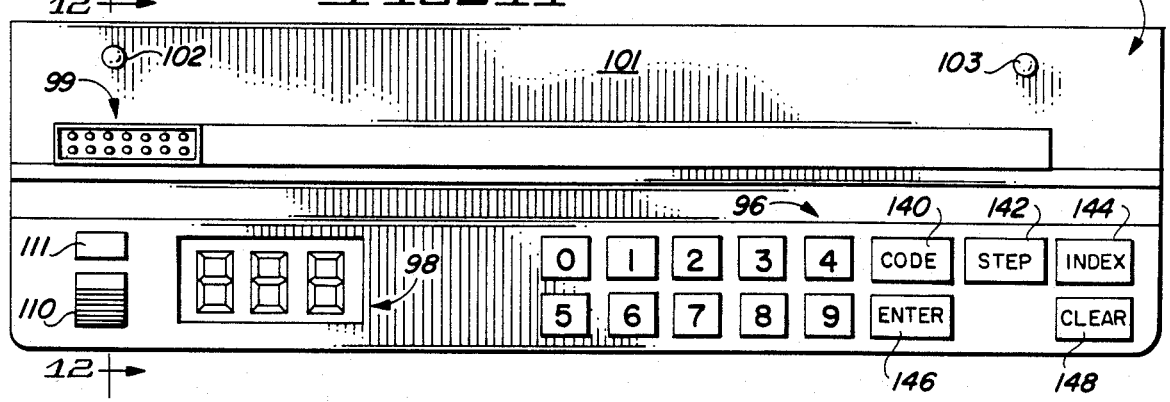

U.S. Patent Sep. 2, 1986 Sheet 4 of 4 4,609,232
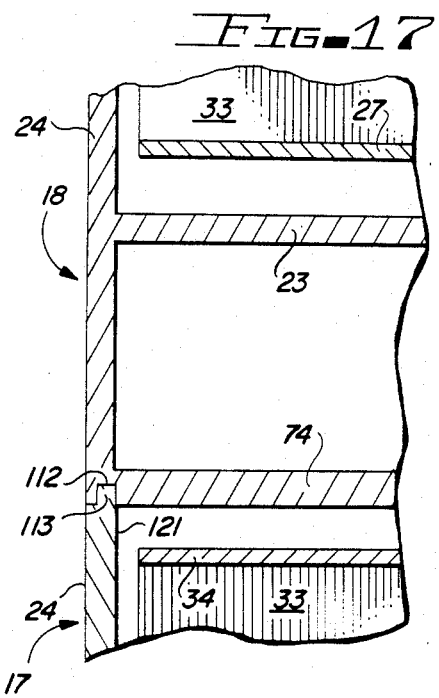
FIG-17
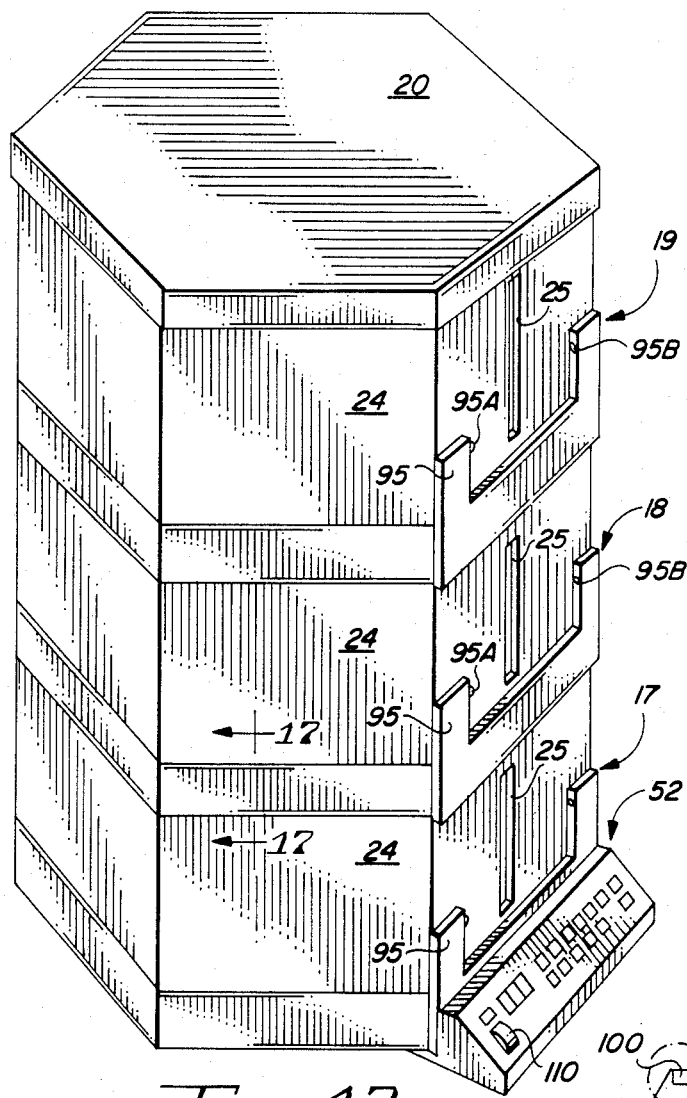
FIG-13
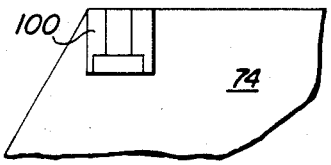
FIG-15
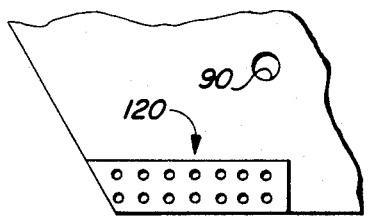
FIG-16
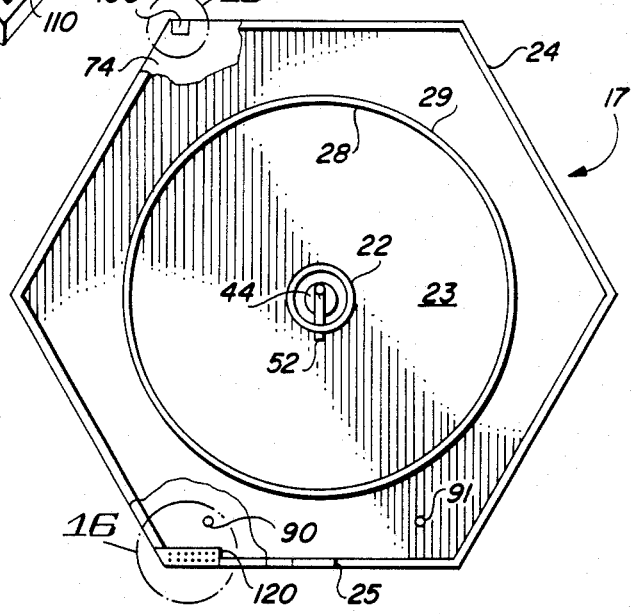
FIG-18
FIG-14

FLOPPY DISK STORAGE-EJECTION SYSTEM

This invention pertains to apparatus for storing and dispensing floppy disks and other panel-shaped objects.

More particularly, the invention relates to floppy disk storage apparatus which includes a rotatable storage rack for floppy disks and a mechanism for selectively dispensing floppy disks from the storage rack and, which includes a motor movable between two operative positions to alternately provide motive power to rotate the storage rack and drive the floppy disk dispensing mechanism.

In a further respect, the invention pertains to floppy disk storage apparatus of the type described in which the motor is moved between two operative positions by a sloped surface which contacts and is slidably reciprocated across the base of the motor to raise and lower the motor.

In another respect, the invention pertains to apparatus including a plurality of generally identical self-contained floppy disk storage dispensation modules which can be stacked one on top of the other, the stacked modules all being operated by a single master control unit attached to the base module.

Magnetic floppy diskettes are widely utilized in connection with personal computers, electronic typewriters, word processing equipment, and other types of apparatus which include a microcomputer control system. Each floppy disk is provided with a paper envelope pocket which permits the disk to be conveniently handled without fingerprints being formed on the face or back of the disk. The top portion of the disk extends visably upwardly from the envelope pocket. Information describing the contents of the disk is inscribed on the upper portion of the disk so that a user holding the disk in its protective envelope can read the descriptive information.

Storage of floppy disks is customarily accomplished by placing the disks and their protective envelopes in a drawer-like container in the same manner that reference catalogue cards for books are stored in file drawers in a public library. Alphabetized cards or other types of index markers are intermittently placed among the disks to facilitate location and identification of particular disks. Commercially available floppy disk storage containers include the DISKBANK MEDIA MATE disk drawer by Amaray Corporation of 2251 Grant Road, Los Altos, Calif. 94022, the RING KING 070 TRAY with hinged lid by Ring King Visibles, Inc. of 2210 Second Avenue, Muscatine, Iowa 52761; and, the ROLLTOP 100 DISK FILE by Microcomputer Accessories, Inc. of 5721 Buckingham Parkway, Culver City, Calif. 90230. When floppy disks are stored in such containers, the top portions of only a few disks are visible at any time. A user must, in the manner that an individual flips through three by five cards in the card catalogue drawer of a public library, normally flip through the disks in the container to locate a desired disk. After several disks have been removed from the storage container and utilized, the user must again flip through the disks remaining in the container to locate the appropriate spaces in which to return used disks. Although such procedures are straightforward, they are sufficiently time consuming to often cause an individual utilizing multiple floppy disks to delay the return of a used disk to its protective envelope and to delay refiling the disk and envelope in the storage container. As a result, a plurality of disks and empty disk container envelopes accumulate on the top of a desk or other work area.

Floppy disks are relatively fragile and exhibit minimal resistance to bending, magnetic fields, static electricity, high humidity, and environmental pollutants like dust, cigarette smoke and epidermal oils. Disks and empty disk protective pocket envelopes laying on the top of a desk are especially susceptible to being soiled or otherwise damaged.

Another drawback of conventional floppy disk storage containers is that a container holding a limited number of floppy disks occupies a comparatively large area of desk top space.

Accordingly, it would be highly desirable to provide an improved floppy disk storage unit which would permit individual disks stored in the unit to be rapidly identified, would permit the storage slot for a removed disk to be readily identified so the disk could be promptly returned when the user finished utilizing the disk, and would permit storage of a large number of disks in comparison to the amount of desk top area occupied by the floppy disk storage unit.

Therefore, it is a principal object of the invention to provide improved apparatus for storing magnetic computer data disks and other panel-shaped members.

A further object of the invention is to provide improved floppy disk storage apparatus which permits disks stored in the apparatus to be quickly located such that individual disks can be rapidly identified and removed from the storage apparatus.

Another object of the invention is to provide improved magnetic disk storage apparatus which permits an empty storage slot in the apparatus to be quickly matched with its assigned disk so the disk may be promptly returned to the storage device after use.

Still a further object of the instant invention is to provide improved magnetic disk storage apparatus which will not permit a disk to be removed from the apparatus until an earlier removed disk is returned to its assigned slot in the apparatus.

Yet another object of the invention is to provide improved magnetic disk storage apparatus which permits the storage of a large number of magnetic disks in relation to the area of desk space occupied by the apparatus.

These and other, further and more specific objects and advantages of the invention will be apparent to those skilled in the art from the following detailed description thereof, taken in conjunction with the drawings, in which:

FIG. 1 is a perspective view illustrating a floppy disk storage-dispensation module and control unit constructed in accordance with the principals of the invention;

FIG. 2 is an exploded assembly view of the floppy disk storage-dispensation module of FIG. 1 further illustrating interior construction details thereof;

FIG. 3 is a side sectional view of the bottom portion of the floppy disk storage-dispensation module of FIG. 2 taken along section line 3—3 thereof and illustrating the drive mechanism thereof;

FIG. 4 is a top view of the drive mechanism of FIG. 3;

FIG. 5 is an enlarged side view of a portion of the drive mechanism of FIG. 5 illustrating the mode of operation thereof;

FIG. 6 is an enlarged side view of the storage module of FIG. 2 taken along section line 6—6 thereof and illustrating the disk ejection mechanism thereof;

FIG. 7A is a top view illustrating the cam unit of the ejection mechanism of the floppy disk storage-dispensation module of FIG. 6;

FIGS. 7B and 7C are top views illustrating the mode of operation of the ejection mechanism of the storage-dispensation module of FIG. 6;

FIG. 8 is a perspective view illustrating the motor which provides motive power to drive the floppy disk storage-dispensation module of FIG. 1;

FIG. 9 is a perspective assembly view illustrating the sloped contact members utilized to upwardly and downwardly displace the motor of FIG. 8 between its operative positions;

FIG. 10 is a side elevation view of the motor and sloped contact members of FIG. 9;

FIG. 11 is a top view illustrating the control unit of the floppy disk storage-dispensation apparatus of the invention;

FIG. 12 is a side section view of the control unit of FIG. 11 taken along section line 12—12 thereof and further illustrating internal construction details thereof;

FIG. 13 is a perspective view illustrating a plurality of floppy disk storage-dispensation modules stacked one on top of the other;

FIG. 14 is a top view illustrating the bottom module of FIG. 13 with the lid and floppy disk storage carousel removed therefrom;

FIG. 15 is an enlarged top view illustrating the power inlet of the floppy disk storage module of FIG. 14;

FIG. 16 is an enlarged top view illustrating the male electrical transmission pins of the storage module of FIG. 14, the pins being utilized to transmit electricity from the module to another module stacked thereon;

FIG. 17 is a section view of a pair of the stacked modules of FIG. 13 taken along section line 17—17 thereof and illustrating the interfitting of the modules; and FIG. 18 is a fragmentary elevational view illustrating the vertical support members.

Briefly, in accordance with my invention, I provide improved apparatus for storing and selectively dispensing panel-shaped members. The apparatus includes a frame;

a carousel rotatably mounted on the frame and including an arcuate generally continuous outer surface, and a plurality of generally radially extending storage compartments formed in the arcuate surface, the storage compartments and associated slots being shaped and dimensioned such that one of the panel-shaped members can be inserted through one of the slots into its associated storage compartment; ejection means for dispensing one of the panel-shaped members from one of the storage compartments; means for rotating the carousel such that one of the storage compartments can be moved from one position to a second position at which one of the panel-shaped members carried in one of the storage compartments can be dispensed therefrom by the ejection means; means for providing motive power to the ejection means and carousel rotating means. The motive power means includes a motor having a first contact surface, the motor being movable between at least two operative positions, a normal primary operative position in which the motor provides motive power to one of the carousel rotating means and the ejection means and a secondary operative position in which the motor provides motive power to the other of the carousel rotating means and the ejection means; a control member having a second contact surface for slidably engaging the first contact surface of the motor; and, means for displacing one of the motor and the control member such that the first and second contact surfaces slidably engage to move the motor from the primary operative position to the secondary operative position.

Turning now to the drawings, which depict the presently preferred embodiment and best mode of the invention for the purpose of illustrating the practice thereof and not by way of limitation of the scope of the invention, and in which identical reference characters correspond to like elements throughout the several views, FIGS. 1 to 17 illustrate the presently preferred embodiment and best mode of the invention, including modules 17, 18, 19 (FIGS. 1 and 3) which can be stacked one on top of the other. Modules 17, 18, 19 are identical except that base module 17 is, as illustrated in FIGS. 14 and 15, provided with an electrical input attached to a line leading from a conventional 120 VAC wall plug or from a transformer. Base module 17 is also provided with means for attaching control unit 52 thereto. Each module 17-19 includes a lid 20 which is removed when another companion module is stacked on top of the module. Each module includes a circular carousel unit 21 rotatably carried on upstanding cylindrical spindle 22 fixedly attached to panel 23. Hexagonal wall 24 attached to panel 23 circumscribes carousel unit 21 and includes floppy disk dispensing slot 25. Handle 26 permits carousel unit 21 to be slidably lifted from spindle 22 in the direction indicated by arrow A in FIG. 2. When carousel 21 is in position on spindle 22 as illustrated in FIG. 3, circular bottom panel 27 rides on upper bearing surface 28 of fixed circular rail 29. Fixed circular rails 30 and 31 downwardly depend from panel 27 and maintain carousel 21 on bearing 28 of upstanding rail 29. Toothed gear 54 engages circular toothed gear surface 55 of rail 30 to rotate carousel 21. Radially projecting spaced panels 33 are connected to circular parallel opposed upper and lower panels 34 and 27. Outer vertical edges or lips 32 of panels 33 lie in and generally define an arcuate circular surface circumscribing the space between panels 34 and 27. Each adjacent pair of lips 32 defines a rectangular vertically oriented slot 36 through which a floppy disk or other panel-shaped member 40 (FIG. 6) can be inserted or removed from between the panel members 33 associated with each pair of lips 32. Circular apertures 37, 38 are formed through panels 34, 27 about the centerpoints thereof. Inner vertical edges 39 of panels 33 lie in and generally define an imaginary cylindrical plane spanning the distance between and intersecting circular apertures 37 and 38.

As shown in FIG. 6, rod 42 extends upwardly through hollow spindle 22 and is provided at its lower end with toothed gear 43 and at its upper end with circular panel 44. Pin 45 is fixedly connected to panel 44. Rod 42 is rotatably mounted in bushings 46, 47. Bushings 46 and 47 are mounted in floor 23 and circular panel 49, respectively. Panel 49 is attached to the inner wall of spindle 22. Rod 50 is pivotally attached to pin 45 and extends through triangular opening 51 formed in hollow spindle 22. During operation of the apparatus of the invention, motive power is, as will be described, applied to toothed gear 43 to rotate gear 43, rod 42 and circular cam member 44 in the direction of arrow B. When cam member 44 rotates in the direction of arrow B, rod 50 pivots about pin 45 and passes through aperture 51 in the manner illustrated in FIGS. 7A-7C. When the distal end 52 emerges from slot 51 in the direction of arrow C, it passes between an adjacent pair of panel members 33 and, in the manner illustrated in FIG. 6, contacts and pushes a floppy disk 40 from between members 33 and through rectangular aperture 25 formed in hexagonal housing 24. The ejection mechanism of FIGS. 7A-7C only operates to dispense a floppy disk 40 from between a pair of panels 33 which are in registration with opening 25 such that when disk 40 is pushed in the direction of arrow C a portion of disk 40 passes through aperture 25. The portion of disk 40 which passes through aperture 25 is grasped and pulled to completely remove disk 40 from the apparatus of the invention. When the ejection mechanism of FIGS. 7A-7C is activated, panel 44 is rotated through one full revolution from its normal operative position of FIG. 7A and is stopped. Consequently, when the ejection mechanism of FIGS. 7A-7C is activated, panel 44 begins to rotate from its rest position of FIG. 7A in the direction of arrow B, continues to rotate through the position of FIG. 7C, returns to its rest positions of 7A, and stops. In the presently preferred embodiment of the invention electronic keyboard unit 52 is utilized to activate the ejection mechanism of FIGS. 7A-7C.

The gearing and motor for supplying motive power to gears 43 and 54 is illustrated in FIGS. 3-5 and 8-10 and includes gears 54 and 57 fixedly attached to shaft 56. Toothed gears 58, 59 are attached to rotatable shaft 60. Rotatable shaft 61 carries gears 62, 63. Gears 65, 66 are connected to rotatable shaft 67. Rotatable shaft 68 carries depending toothed gears 69, 70. Shaft 16 carries gears 71, 72. The upper and lower ends of shafts 56, 60, 61, 67 are journalled for rotation in parallel circular panels 23, 74, respectively.

The upper end of shaft 68 and lower end of shaft 86 are rotatably received by sleeve 85. The lower end of shaft 68 is journalled for rotation in panel 74. The upper end of shaft 16 is journalled for rotation in panel 23. Consequently, shaft 16 and gears 71 and 72 carried thereon rotate independently of shaft 68 and gears 69 and 70 carried thereon.

Gear 75 is carried on shaft 76 turned by motor 77. Motor 77 is slidably positioned in upstanding L-shaped members 78. Leads 79, 80 carry electricity to motor 77. Rod 81 is reciprocated by solenoid 82 in the directions indicated by arrows D and E. Wires 83, 84 carry electricity to solenoid 82. Arm 81 of solenoid 82 is connected to sled 86 having sloped contact surfaces 87, 88 which slidably interfit with opposing contact surfaces 89, 90 formed in base 91 of motor 77.

The normal operative position of sled 86 and motor 77 is shown in FIGS. 3, 8 and 10 where gear 75 of motor 77 engages gear 70. When motor 77 is activated gear 75 transmits motive power to gear 70 and through the associated gear train to gear 54 to rotate rail 30 and carousel 21. Motor 77 and sled 86 are moved to their second operative positions by activating solenoid 82 to displace shaft 81 and sled 86 in the direction of arrow F in FIG. 8. Displacing sled 86 in the direction of arrow F causes the bottom 93 of sled 86 to slide over panel 74 and causes contact surfaces 87 and 88 to slide over contact surfaces 89 and 90 and upwardly displace motor 77 in the direction of arrow F iN FIG. 8 to engage gear 75 with gear 43. After motor 77 and sled 86 are displaced to their second operative position illustrated in FIG. 5, electricity is coursed through lines 79, 80 to cause motor 77 to turn gear 75 and operate the disk ejection mechanism illustrated in FIGS. 6 and 7A-7C. Each time motor 77 is activated while in its second operative position, it operates only until circular panel 44 had made a single complete revolution from and returned to its normal operative position of FIG. 7A. Motor 77 is returned to its normal operative position of FIG. 3 by activating solenoid 82 to displace sled 86 in the direction of arrow E (FIG. 4) and lower motor 77 in the direction of arrow G (FIG. 8). Compressed spring 130 forces motor 77 in the direction of arrow E.

A light beam from light source 90 is directed toward photodetector 91. Aperture 92 is formed through gear 59 such that during each rotation of gear 59 aperture 92 passes through the line of sight between light source 90 and photodetector 91, allowing light from source 90 to contact detector 91. Photodetector 91 is in electrical communication with control unit 52. Control unit 52 utilizes the signals from photodetector 91 to count the revolutions of wheel 59 and determine the position of each storage compartment or slot in carousel 21 with respect to floppy disk dispensing slot 25. Although not shown in the drawings for the sake of clarity, an aperture is formed through wheel 43 and a similar light source 90-photodetector 91 pair is utilized in conjunction therewith to determine the number of revolutions of wheel 43 and, accordingly, to determine the position of panel 44 and pin 45 therein. As would be appreciated by those of skill in the art, the position of either a storage slot in carousel 21 or of wheel 44 can be determined either by providing means for counting the revolutions of shaft 76 of motor 77 or by a variety of other means.

Electronic control unit 52 is illustrated in FIGS. 11 and 12 and includes conventional electronics—microprocessor components 97 in electrical communication with keyboard 96, LED readout 98, power input pin unit 99, on-off switch 110, "on" light 111, and with photodetectors 91 associated with gears 59, 43 and dispensing slot 25. The photodetector 91 associated with slot 25 is shown in FIG. 14. Whenever a floppy disk or other panel-shaped member is ejected through slot 25 from a storage compartment in carousel 21, it passes between light source 90 and detector 91, breaking the light beam traveling from source 90 to detector 91. When the light beam from source 90 to detector 91 is broken, a signal is transmitted from detector 91 to control unit 52 which enables control unit 52 to verify that after a command is entered on keyboard 96 to dispense a particular floppy disk 40, the ejection mechanism has functioned and a disk has been dispensed through slot 25.

Unit 52 includes foot 101 carying pin unit 99 and pegs 102, 103. The male pins in unit 99 are received by female openings in unit 104 carried in base 74 of a base module 17. Pegs 102, 103 are received by cylindrical apertures 106 formed in base 74.

Each individual module 17-19 is adapted to be stacked beneath another module in the manner illustrated in FIGS. 13 and 17. U-shaped circular opening 112 formed around the periphery of base 74 of a module snaps onto upstanding U-shaped circular lip 113 formed around the upper edge of housing 24.

Each base module 17 is provided with an inlet 100 for a cord from a 120 VAC wall socket or from some other power source. Electrical wiring (not shown) carries power from inlet 100 to female pin unit 104. Unit 104 transmits power to male pin unit 99 and control unit 52. Control unit 52 selectively transmits power to motor 77 and solenoid 82 through leads 79, 80, 83, 84.

A male pin unit 120 is mounted near the upper edge 121 of housing 24 of each module and is in electrical communication with control unit 52. One of the feet (not shown) on the bottom of base 74 of each stack module 18, 19 carries a female unit 122 (not shown) which couples with unit 120. Female unit 121 in a stack module 18, 19 is in electrical communication with the motor 77, solenoid 82, and photodetectors 91 carried in the module. The male pin unit 120 of a stack module 18, 19 is also in electrical communication with female unit 121 of the module. When modules 17–19 are stacked in the manner shown in FIG. 13, control unit 52 is used to send electrical signals to and individually operate each module 17–19.

In use, a base module 17 is obtained, lid 20 removed, carousel 21 removed by grasping and lifting handle 26, and a floppy disk 40 or other panel-shaped member is slid into each storage compartment between a pair of adjacent panel-shaped member 33. After it is loaded into carousel 21 a floppy disk 40 does not extend out past end surfaces 32 of panels 33 enclosing disk 40. Once carousel 21 is stocked with floppy disks it is inserted inside housing 24 in the manner shown in FIG. 1 and stack modules 18 and 19 are obtained and the lids 20 thereof removed and set aside. The carousels 21 in the stack modules are, in the same manner as was carousel 21 of module 17, stocked with disks 40. Disks 40 can be inserted in carousel 21 with or without their protective paper pockets. Carousels 21 are positioned in modules 18 and 19 and the modules are stacked on base module 17 in the manner shown in FIG. 13. Lid 20 of module 17 is snapped onto stack module 19. Carousel 21 of each module 17–19 preferably contains radially extending storage compartments for 180 floppy disks. The microprocessor memory of control unit 52 assigns numbers 1 to 180 to the disk storage compartments in carousel 21 of module 17; assigns numbers 181 to 360 to the storage compartments in carousel 21 of module 18; and, assigns numbers 361–540 to the storage slots in carousel 21 of module 19. Microprocessor memory can also identify the particular floppy disk in each storage compartment. If the user wishes to dispense the floppy disk in slot 170 he enters the number 170 in keyboard 96. Control unit 52 causes, if necessary, motor 77 to be moved to the normal operative position of FIG. 3 to turn gear 54 and carousel 21 module 17 until storage slot 170 is in registration with slot 25. Unit 52 then activates solenoid 82 to move sled 86 in the direction of arrow F (FIGS. 3, 5, 8) until gear 75 engages gear 71. Motor 77 is activated to turn gear 75 and cause the ejection system of FIGS. 7A–7C to push disk 40 (FIG. 6) from storage compartment 170 and partially through slot 25. The user grasps disk 40 and completely removes it from slot 25. If storage compartment number 300 is entered in keyboard 96, control unit 52 operates motor 77 and solenoid 82 in module 18 to register compartment 300 with dispensation slot 25 and eject disk 40 from compartment 300 through slot 25. If storage compartment number 500 is entered in keyboard 96, control unit 52 operates motor 77 and solenoid 82 in module 19 to dispense the floppy disk in compartment 500 through slot 25 of module 19. The circuitry and microprocessor logic necessary to operate the apparatus of the invention in the manner described above are readily available to or can be designed by those of ordinary skill in the art. Control unit 52 can be programmed such that a floppy disk will not be dispensed from modules 17–19 until an earlier removed disk is returned to its storage compartment.

As earlier noted, solenoid 82 preferably includes means for reciprocating rod 81 in the directions indicated by arrows D and E in FIG. 4. A simple "pull" type solenoid can be utilized as solenoid 82. If a "pull" solenoid is utilized, it is positioned on the left hand side of sled 86 in FIG. 10 and, when activated, pulls sled 86 from the position shown in FIG. 10 to the position shown in FIG. 5 and indicated by dashed lines 131 in FIG. 9. When the "pull" solenoid 82 is deactivated, compressed spring 130 (FIG. 3) and the weight of motor 77 cause sled 86 to slide from the position indicated by dashed lines 131 in FIG. 9 to the position shown in FIGS. 3 and 10.

U-shaped panel member 95 can be mounted inside housing 24 such that light 95A—photodetector pair 95B detects an ejected disk 40 before the disk passes into dispensing slot 25. Light 95A—photodetector pair 95B is in electrical communication with control unit 52 so that unit 52 detects when a disk 40 passes between light—photodetector pair 95A, 95B.

Circular guide rail 31 can, if desired, be omitted from the apparatus of the invention.

Carousel 135 can be constructed without panels 33. If panels 33 are omitted, elongate vertical support members 135 are utilized and span the distance between and maintain circular panels 34 and 27 in parallel, spaced apart relationship. Pairs of opposed parallel, linear, radially extending U-shaped groove pairs (not shown) are formed in lower surface 134 of member 34 and upper surface 133 of member 27. Each pair of opposed grooves, one groove being formed in surface 134 and the other being formed in surface 133, lies in an imaginary vertical plane perpendicular to panel members 27 and 34. Carousel 21 and each pair of opposed, spaced apart parallel grooves are shaped and dimensioned such that a square or rectangular disk 40 can be slid between panel members 27 and 34 with the upper and lower horizontally oriented parallel edges of the disk each sliding into one of the groove pair. The radially extending linear grooves formed in the lower surface 134 of member 34 extend from circular aperture 37 to the outer circular peripheral edge of panel 34. The radially extending linear grooves formed in the upper surface 133 of panel member 27 extend from inner circular aperture 38 to the outer circular peripheral edge of panel 27.

Control unit 52 can be utilized to load disks 40 into a carousel 21 while carousel 21 remains in housing 54. As illustrated in FIG. 11, control unit 52 includes a push button keyboard 96 which includes numbered keys 0 to 9, code key 140, step 142, index key 144, enter key 146 and clear key 148. Switch 110 is pressed to turn on the power to control unit 52 in FIG. 13. Code key 140 is depressed and a numeric security code is punched in with the appropriate ones of numbered keys 0–9. Enter button 146 is depressed to load the code into the control unit 52 microprocessor. If the code is correct and approved by the microprocessor, unit 52 automatically causes carousel 21 of each module 17–19 to be turned such that storage compartments 1, 181 and 361 are in registration with the dispensation slot 25 in their respective modules 17, 18, 19. In the presently preferred embodiment of the invention, control unit 52 will not permit disks 40 to be dispensed until the correct code in entered. After the correct code is entered and unit 52 registeres storage compartments 1, 181 and 361 with dispensation slots 25, a disk 40 is manually inserted through each slot 25 into storage compartments 1, 181 and 361 registered therewith. The light beam 90—detector 91 pair (FIG. 14) within housing 24 of each module 17–19 detects the passage of a disk 40 into a storage compartment and records in microprocessor memory the loading of the storage compartment. Step button 142 is momentarily depressed causing control unit 52 to index carousels 21 in modules 17–19 such that storage compartments 2, 182, and 362 are in registration with dispensing slots 25. Disks 40 are manually loaded through slots 25 into compartments 2, 182 and 362. As the disks 40 are loaded light beam 90—detector 91 pair (FIG. 14) signals control unit 52 and unit 52 records in microprocessor memory that disks 40 are housed in compartments 2, 182, 362. Step button 142 is again momentarily depressed causing control unit 52 to index carousels 21 in modules 17–19 such that storage compartments 3, 183, 363 are in registration with dispensing slots 25. Disks 40 are manually loaded into compartments 3, 183, 363. The foregoing process is continued until all desired slots in the carousels 21 of modules 17–19 are loaded.

If step button 142 is depressed and held, unit 52 continues to index carousels 21 in modules 17–19 one storage compartment at a time until button 142 is released.

When index button 144 is depressed, control unit 52 causes each carousel in modules 17–19 to be displaced such that storage compartments 1, 181 and 361 are moved into registration with dispensation slots 25 thereof.

When the disk 40 in a particular storage compartment is desired, the number of the storage compartment is entered in unit 52 utilizing the appropriate numeric push buttons 0–9 and pushing enter button 146. The entered number is reflected on LED readout 98 and control unit 52 causes the carousel in the appropriate module to rotate until the storage compartment registers with dispensation slot 25 and the ejection mechanism (FIGS. 7A–7C) displaces the disk 40 in the compartment through slot 25.

If a compartment number is punched into the control unit 52 in error, the number can, before enter button 146 is depressed, be cleared from the memory of unit 52 by depressing clear button 148. A new storage compartment number can then be punched into unit 52 with the appropriate numeric push buttons 0–9.

Modules 17–19 can be designed such that a lid 20 can, for security purposes, be locked onto the module with a key or other means.

A carrying cover can be provided for each carousel 21 which permits handle 25 on the carousel to be utilized to carry the carousel separately from a module 17–19. The presently preferred cover is fabricated from clear lightweight plastic and includes a cylindrical wall which circumscribes and spans the distance between the peripheral circular edges of panel members 27 and 34. A vertically oriented inwardly depending lip is formed around the upper edge of the cylindrical wall and contacts the upper surface of member 34 to prevent the cylindrical wall of the carrying cover from slipping downwardly off of carousel 21.

Control unit 52 can be connected to another existing computer and the existing computer utilized to operate the apparatus of the invention.

Having described my invention in such terms as to enable those skilled in the art to understand and practice it and having identified the presently perferred embodiments and best mode thereof, I claim:

1. Apparatus for storing and selectively dispensing panel-shaped members, said apparatus including
   (a) a frame;
   (b) a carousel rotatably mounted on said frame and including
      (i) an arcuate generally continuous outer surface, and
      (ii) a plurality of generally radially extending storage compartments formed therein and each extending to an associated slot formed in said arcuate surface, each of said storage compartments and associated slots being shaped and dimensioned such that one of said panel-shaped members can be inserted through said slot into said storage compartment;
   (c) ejection means for dispensing one of said panel-shaped members from one of said storage compartments;
   (d) means for rotating said carousel such that one of said storage compartments can be moved from one position to a second position at which one of said panel-shaped members carried in one of said storage compartments can be dispensed therefrom by said ejection means;
   (e) means for providing motive power to said ejection means and carousel rotating means, said motive power means including
      (i) a motor having a first contact surface, said motor being movable between at least two operative positions
         a normal primary operative position in which said motor provides motive power to one of said carousel rotating means and said ejection means, and
         a secondary operative position in which said motor provides motive power to the other of said carousel rotating means and said ejection means,
      (ii) a control member having a second contact surface for slidably engaging said first contact surface of said motor, and
      (iii) means for displacing one of said motor and said control member such that said first and second contact surfaces slidably engage to move said motor from said primary operative position to said secondary operative position.

* * * * *